LEAK TESTING APPARATUS

Original Filed April 23, 1965 7 Sheets-Sheet 1

INVENTORS
RICHARD T. FITZPATRICK
RAY MOORE, Jr.
BY
Curtis, Morris & Safford
ATTORNEYS

LEAK TESTING APPARATUS

Original Filed April 23, 1965 7 Sheets-Sheet 2

INVENTORS
RICHARD T. FITZPATRICK
RAY MOORE, Jr.
BY
Curtis, Morris & Safford
ATTORNEYS LEAK TESTING APPARATUS
Original Filed April 23, 1965 7 Sheets-Sheet 3
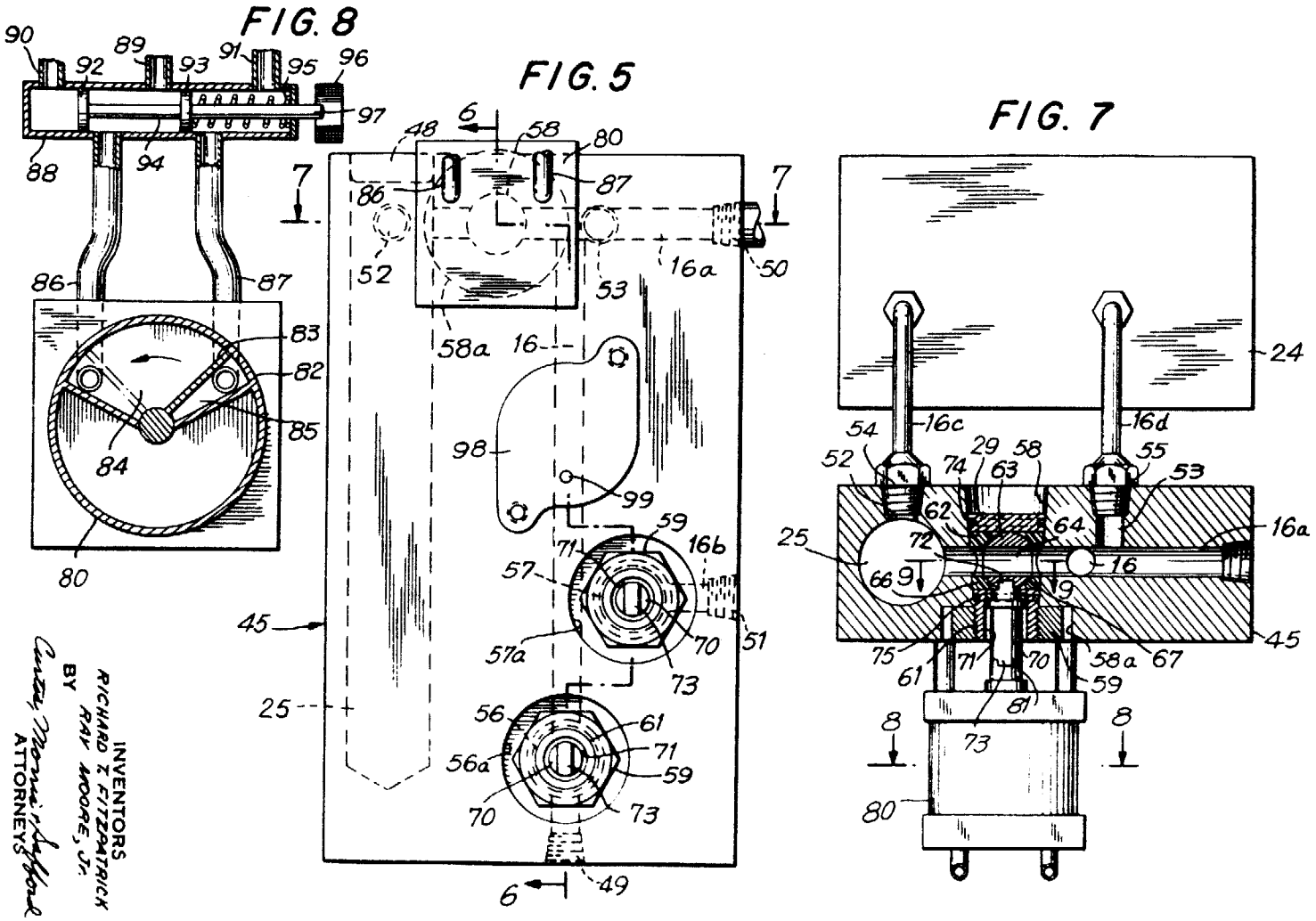
INVENTORS
RICHARD T. FITZPATRICK
RAY MOORE, Jr.
BY
Curtis, Morris & Safford
ATTORNEYS

LEAK TESTING APPARATUS

Original Filed April 23, 1965 7 Sheets-Sheet 4

INVENTORS
RICHARD T. FITZPATRICK
RAY MOORE, Jr.
BY
Curtis, Morris & Safford
ATTORNEYS

LEAK TESTING APPARATUS

Original Filed April 23, 1965 7 Sheets-Sheet 5

INVENTORS
RICHARD T. FITZPATRICK
RAY MOORE, Jr.
BY
Curtis, Morris & Safford
ATTORNEYS

LEAK TESTING APPARATUS

Original Filed April 23, 1965 7 Sheets-Sheet 6

INVENTORS
RICHARD T. FITZPATRICK
RAY MOORE, Jr.
BY
Curtis, Morris & Safford
ATTORNEYS

LEAK TESTING APPARATUS

Original Filed April 23, 1965 7 Sheets-Sheet 7

INVENTORS
RICHARD T. FITZPATRICK
RAY MOORE, Jr.

United States Patent Office

Re. 26,661
Reissued Sept. 9, 1969

26,661
LEAK TESTING APPARATUS

Richard Thomas Fitzpatrick and Ray Moore, Jr., by Ajem Laboratories, Inc., assignee, Livonia, Mich., a corporation of Michigan Original No. 3,326,034, dated June 20, 1967, Ser. No. 451,103, Apr. 23, 1965. Application for reissue Feb. 23, 1968, Ser. No. 710,439
Int. Cl. G01m *3/04*
U.S. Cl. 73—40 27 Claims

Figure 1:
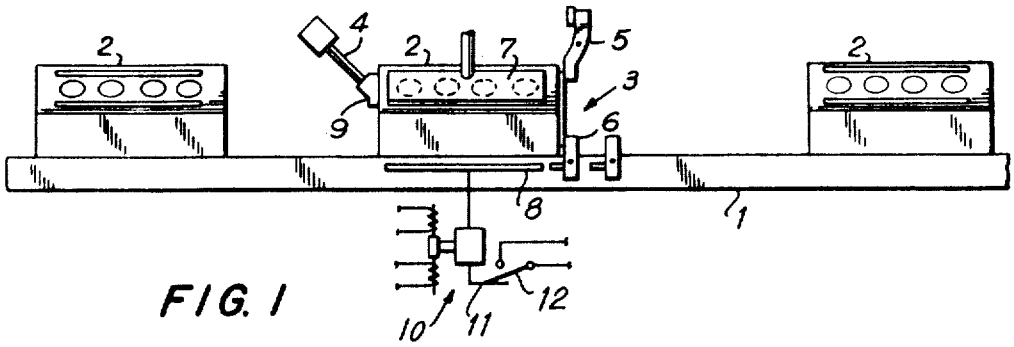

Matter enclosed in heavy brackets [ ] appears in the original patent but forms no part of this reissue specification; matter printed in italics indicates the additions made by reissue.

The present invention relates to an apparatus for testing parts for leaks and more particularly to improvements in apparatus of the type described and claimed in our prior application Ser. No. 375,515, filed June 16, 1964, and entitled, Leak Testing Method and Apparatus. The present application is a continuation-in-part of our prior application Ser. No. 424,741, filed Jan. 11, 1965, and entitled, Leak Testing Apparatus.

The testing apparatus illustrated and described in our prior application, referred to above, has a station where parts to be tested, such as engine castings, are stopped as they are moved along a conveyor. The apparatus operates to close and seal openings in the castings to form a closed chamber therein. Valves in a fluid system operate to supply a testing fluid under pressure to the closed chamber in the part being tested and to separate chambers in a measuring instrument having a movable diaphragm therebetween. After the fluid attains a predetermined pressure in the system, the valves shut off the supply of fluid and segregate one chamber of the measuring instrument from the other chamber connected to the part being tested. Movement of the diaphragm, due to a difference in pressure resulting from a leak from the part being tested, operates through a transducer to produce a voltage directly proportional to the difference in pressure. The voltage, in turn, is then utilized to control an electric circuit for indicating whether there is a large leak, a small leak or no measurable leak in the part.

The electric control circuit automatically controls the initiation of the testing steps and has branches with RC networks and semi-conductor current control elements for timing the various testing steps. The timing branches when energized successively operate an indexing mechanism for actuating stepping switches to connect the various branches which control the valves to initiate the various testing steps, time the duration of the steps and indicate the results of the test. This prior leak testing apparatus operates in a very satisfactory manner to test parts for leaks and has had commercial acceptance.

One of the objects of the present invention is to provide an improved electric testing apparatus of the type indicated which automatically tests a part in a shorter period of time with accurate reproducibility than has been possible with prior leak testing apparatus.

Another object is to provide an improved electric testing apparatus which is more sensitive in detecting leaks and responds more quickly to indicate a leak than prior leak testing devices.

Another object is to provide an improved electric testing apparatus which reduces errors due to ambient conditions such as temperature variations and more quickly produces a stabilized condition for accurate measurement of a leak in the part being tested.

Another object is to provide an electric testing apparatus of the type indicated which may be easily and quickly adjusted through a wide range to vary the magnitude of a leak that will be indicated.

Another object of the present invention is to provide an improved electronically controlled leak testing apparatus with a minimum number of moving parts to reduce hysteresis and chance of error due to mechanical failure.

Still another object of the present invention is to provide an improved electronically controlled leak testing apparatus for automatically performing a leak testing operation which is of extremely simple and compact construction, economical to manufacture and one which is extremely rapid and reliable in indicating a leak in a part being tested.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

Figure 2:
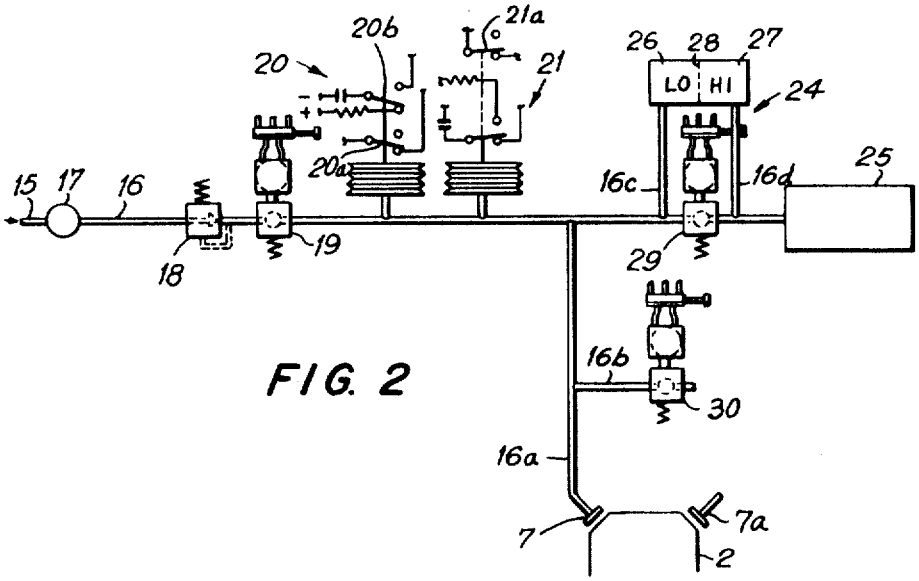
Figure 3:
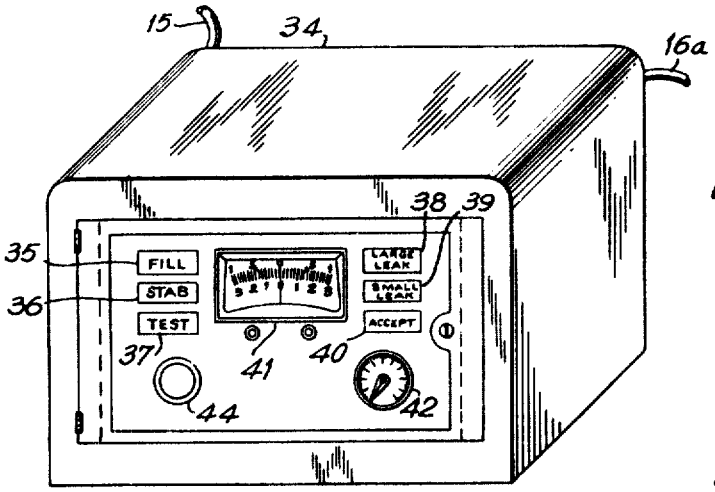
Figure 6:
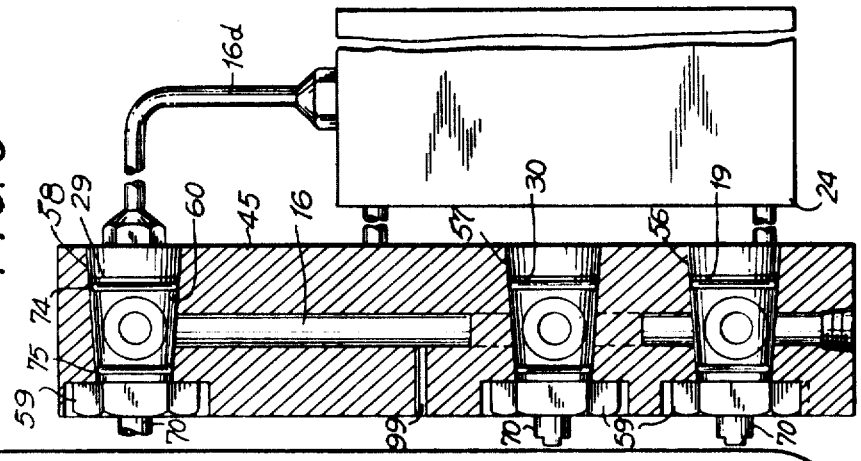
Figure 4:
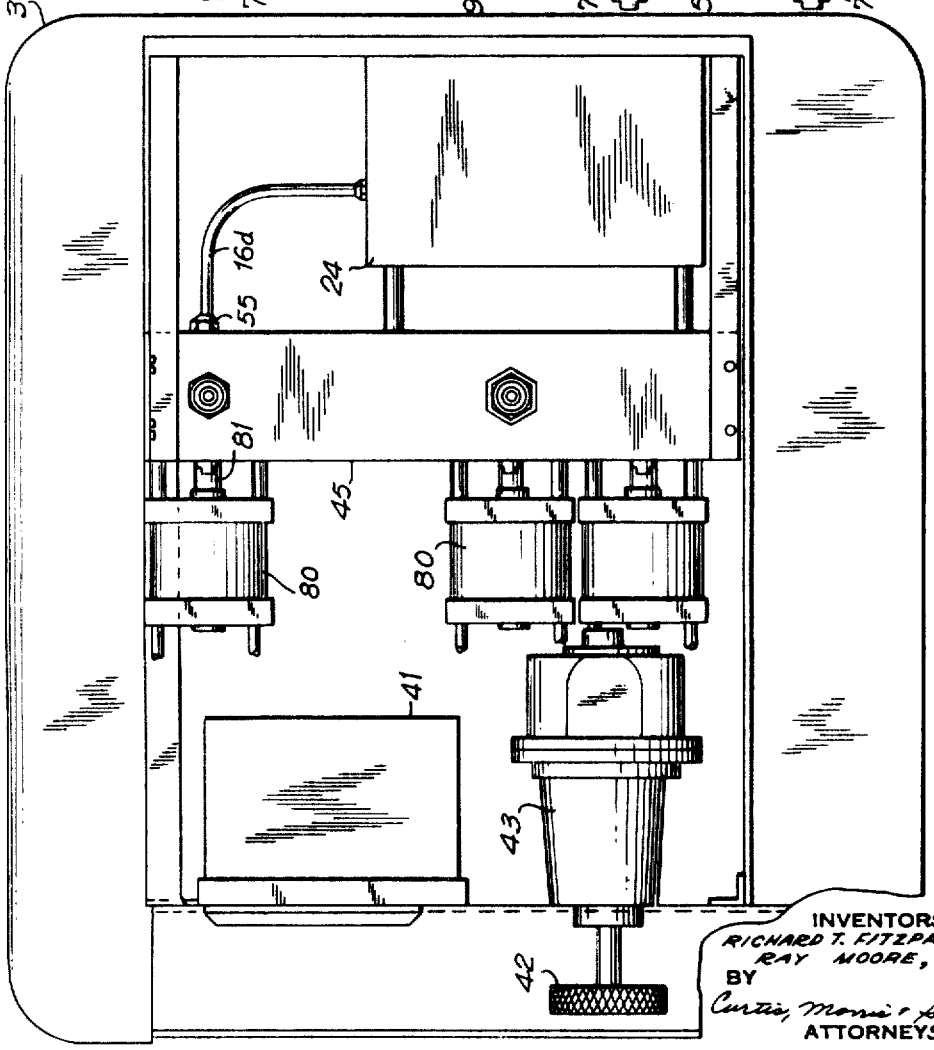
Figure 10:
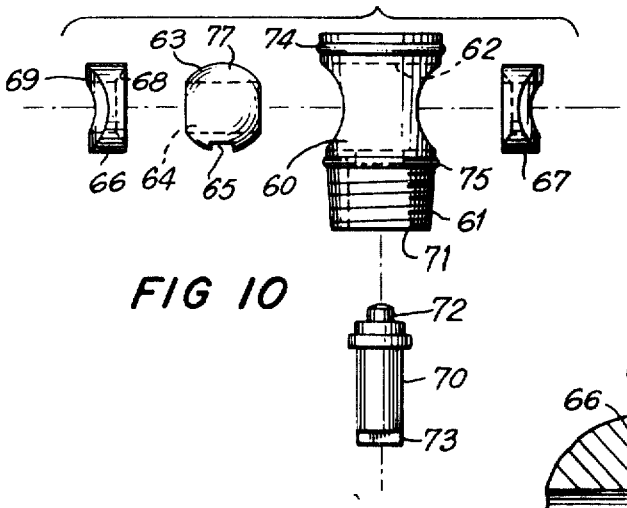
Figure 9:
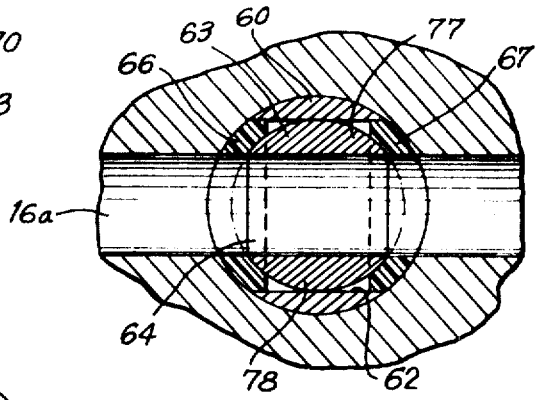
Figure 11:
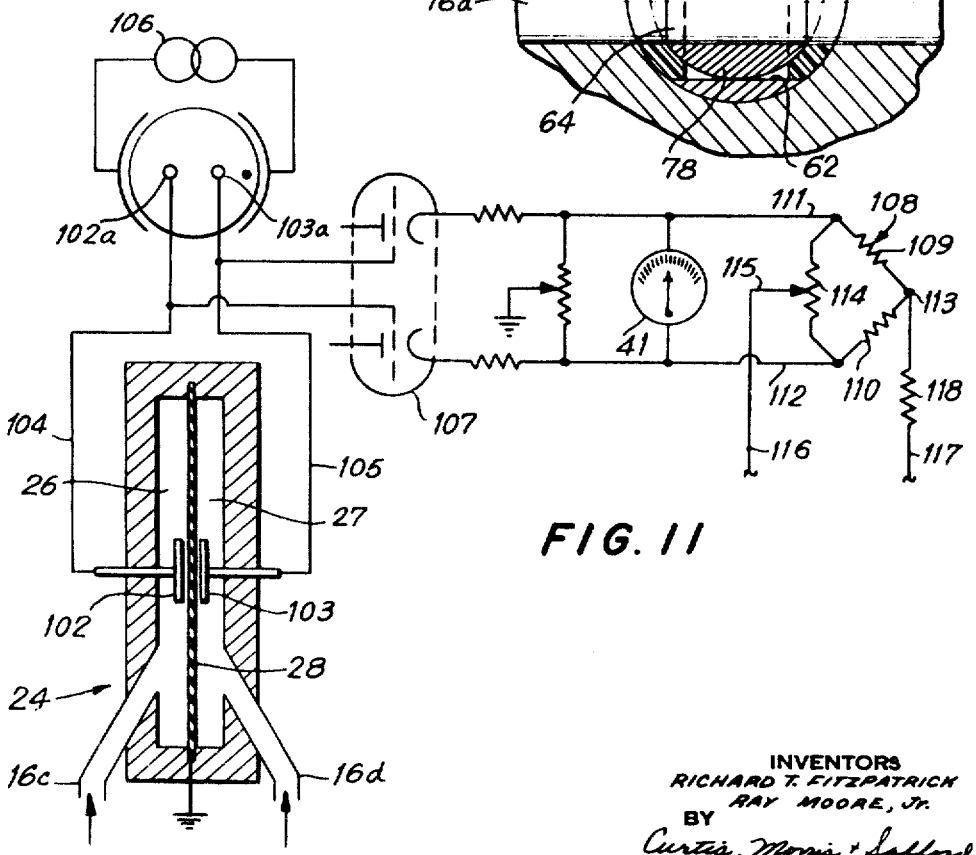
Figure 12:
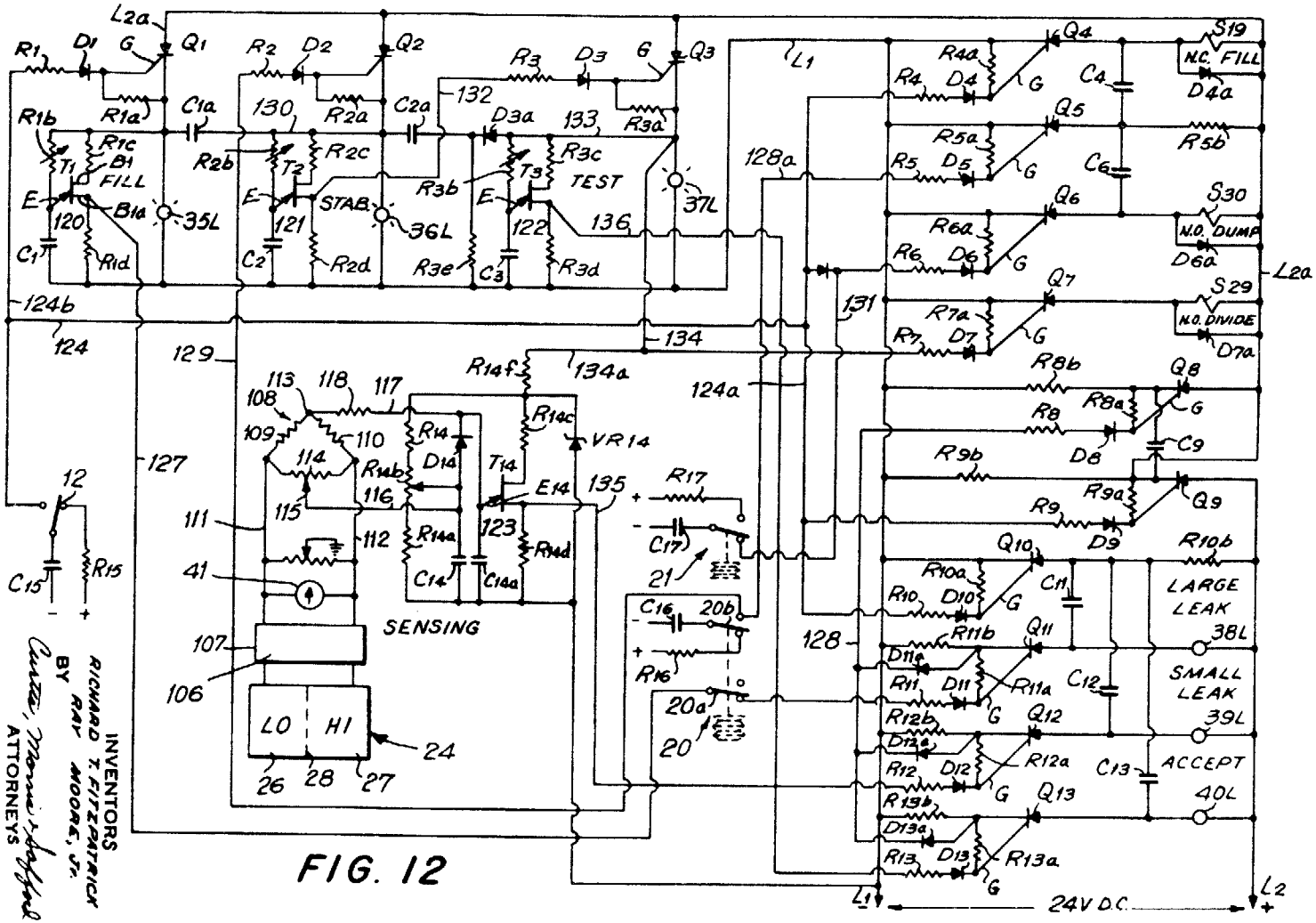
Figure 13:
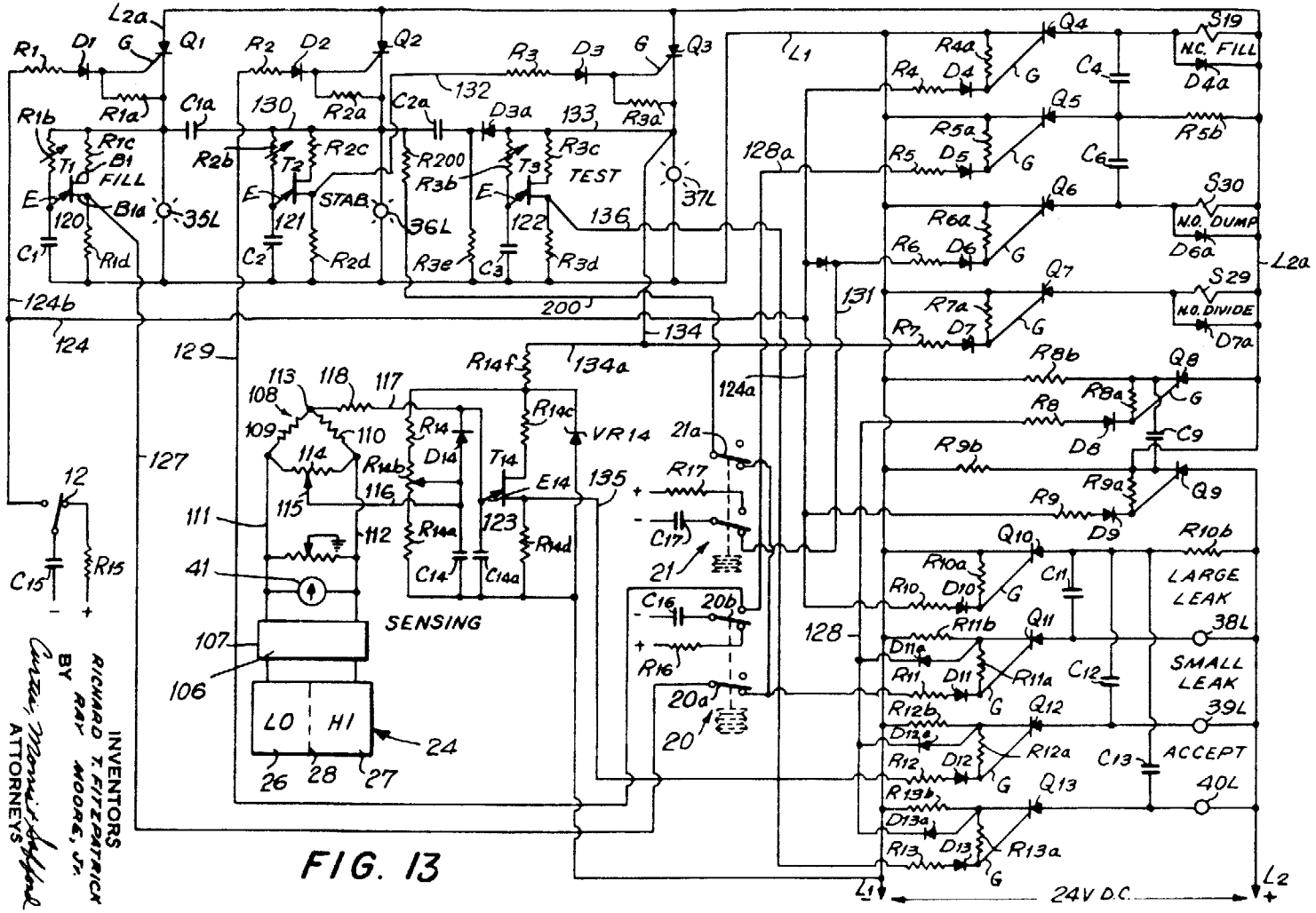
Figure 16:
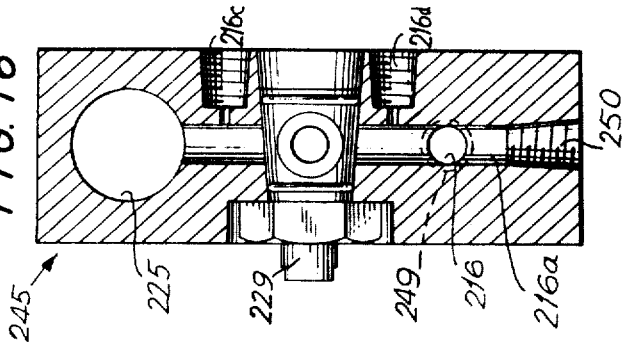
Figure 15:
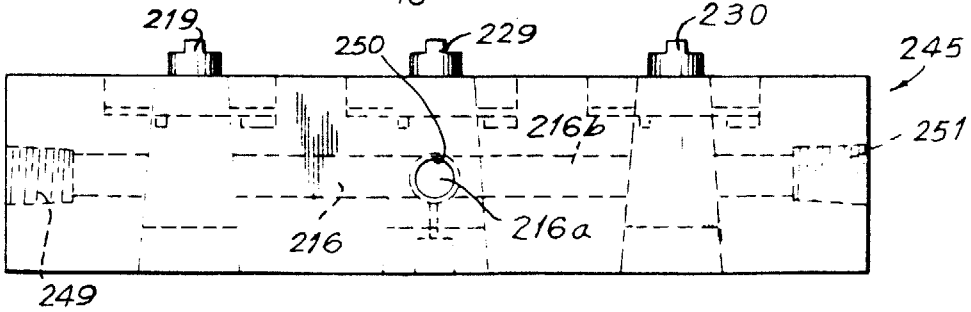
Figure 14:
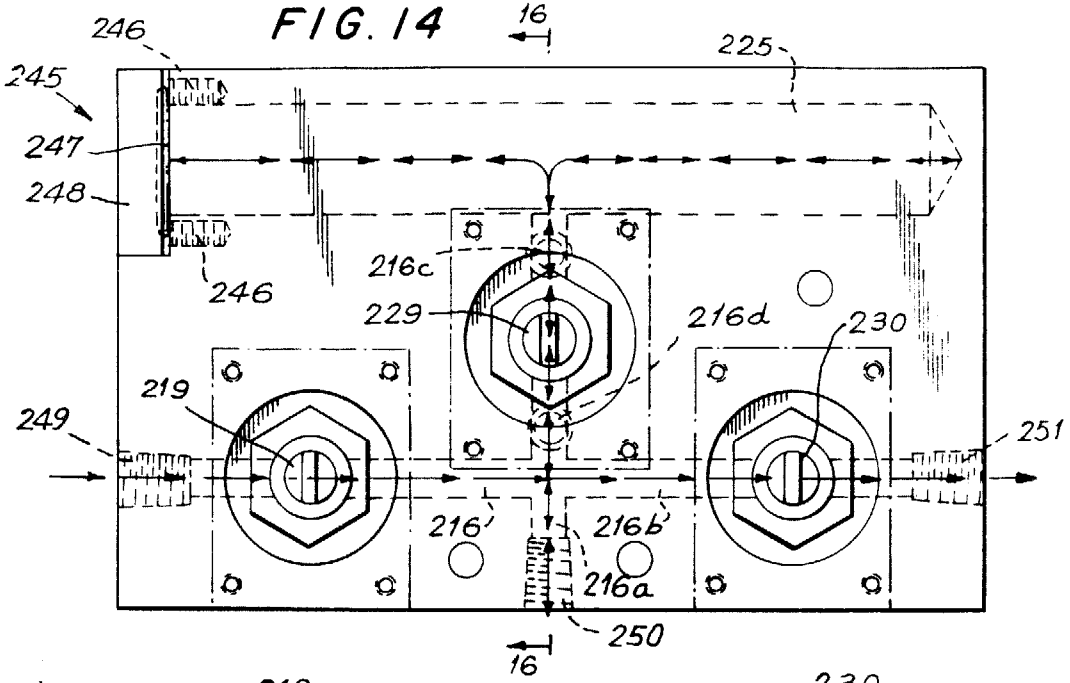

In the drawings:

FIGURE 1 is a diagrammatic view of a production line conveyor at a testing station and showing the manner of clamping the part to be tested and sealing the cavities therein for a testing operation and the control switch for initiating a testing operation; and FIGURE 2 is a diagrammatic view of a pneumatic testing system showing the manner of connecting the cavity in a part to be tested for comparison with a trapped sample to indicate a difference in pressure when a leak occurs; and FIGURE 3 is a perspective view of a cabinet in which the entire testing apparatus is incorporated; and FIGURE 4 is a side elevational view of the cabinet illustrated in FIGURE 3 with a side of the cabinet removed to show the arrangement of parts including a manifold block and measuring instrument; and FIGURE 5 is a front view of the manifold block showing the location of the passageways forming conduits therein and the control valves therefor; and FIGURE 6 is a longitudinal sectional view taken on line 6—6 of FIGURE 5 and showing the valves extending through the manifold block and in alignment with the passageways therein; and FIGURE 7 is a sectional plan view taken on line 7—7 of FIGURE 5 to show the divide valve in the passageways in the manifold block between the separate chambers of the measuring instrument, the spherical form of the valve and its actuator; and FIGURE 8 is a transverse sectional view taken on line 8—8 of FIGURE 7 and showing a type of fluid motor that may be used for actuating the valves and a piston type control valve in section; and FIGURE 9 is an enlarged sectional view taken on line 9—9 of FIGURE 7 to show how the spherical valve element is mounted for rotary movement in its housing; and FIGURE 10 is an exploded view of the parts of the valve to show the construction in detail; and FIGURE 11 is a diagrammatic view of the measuring instrument for producing voltage variations directly proportional to a difference in pressure; and FIGURE 12 is a diagrammatic view of the electric circuit for automatically initiating the successive steps of a testing operation and indicating the results of the test; and FIGURE 13 illustrates a modified arrangement of the electric circuit in FIGURE 12 to show an additional circuit branch for indicating a large leak; and FIGURES 14 to 16 inclusive illustrates a manifold block of modified construction.

The present invention resides in a plurality of separate improvements in the testing apparatus of our prior application Ser. No. 375,515 which cooperate with each other to produce a substantial improvement in the apparatus as a whole. One of these features of improvement resides in the selection, construction and arrangement of elements to reduce the size and cost of the testing apparatus. Another feature of improvement resides in a pneumatic system which requires only three control valves, and simplifies the coring in the manifold block. Another feature is the kind of valves used and their arrangement in the manifold block which avoid any displacement of the testing medium when operated. Another feature is the close arrangement of the manifold block and measuring instrument together with the mechanical valve actuators to reduce the possibility of errors resulting from temperature differences at different locations of the pneumatic system and heat conduction from electromagnetic windings of solenoid valve actuators. Another feature of improvement is the elimination of all mechanically operated switches except the pressure operated switches. Another feature is the provision of an improved electronic sensing circuit which is more sensitive to the occurrence of small leaks. Still another major feature of improvement resides in the electronic control circuit in which the semiconductor current control devices are used to time and control the steps of a testing operation without any delay. These and other features will become more apparent from the following description which result in an automatically operable testing apparatus which is more sensitive in detecting a leak, more quickly responsive in indicating a leak, more accurate in indicating a leak and more reliable in operation than previously known leak testers.

Referring now to the drawings, FIGURE 1 illustrates a conveyor 1 for intermittently advancing parts 2 to a station 3 where the parts are to be tested for leaks. In the illustrated embodiment the parts 2 are shown in the form of automobile engine blocks having internal cavities in the form of cylinders and valve ports. At station 3 the engine block 2 is stopped by a ram 4 which engages its front end and clamps the block against dogs 5 and 6 at its rearward end. Closures 7 and 8 are then operated to cover and seal openings, such as the valve ports and crank case opening in the block, and the ram 4 has a seal 9 which also closes the opening in the front end of the block for connection to a water pump (not shown). Closure 8 is shown diagrammatically as operated by an electro-magnetic actuator 10 having an extension 11 which operates a switch 12 to initiate a testing operation. While not shown, it will be understood that ram 4 and closures 7 and 8 are operated automatically in sequential order and that the closure 8 will be the last to be actuated so that all of the openings will be closed and sealed before switch 12 is closed to initiate a test.

The testing apparatus is illustrated diagrammatically in FIGURE 2 as comprising a fluid pressure system having a source of fluid 15 at high pressure, for example, air at 120 pounds per square inch. A conduit 16 from the fluid source 15 has a filter 17 and pressure regulator 18 therein for reducing the pressure from 120 pounds per square inch to 45 pounds per square inch. Beyond the pressure regulator 18 is a normally-closed rapid-fill valve 19 and pressure operated switches 20 and 21. The switches 20 and 21 are shown separately in FIGURES 2 and 12 for purposes of description, but it will be understood that they may be combined in a single unit. Switch 20, referred to herein as the high pressure switch, is a double pole type having one normally-closed contact 20a which opens at 35 pounds per square inch and one normally-open contact 20b which closes when a pressure of, for example, 45 pounds per square inch occurs in the conduit 16. Low pressure switch 21 is normally-open above 35 pounds per square inch and closed at 35 pounds per square inch and below. As thus far described, the apparatus is similar to that described and claimed in a prior pending application of Dewey M. Evans et al. Ser. No. 779,349 now Patent No. 3,221,539 and in our prior application Ser. No. 375,515, referred to above.

In accordance with the present invention a measuring instrument 24 is connected to the conduit 16 beyond the low pressure switch 21 and the end of the conduit terminates in a ballast tank 25. The measuring instrument 24 has separate cells or chambers 26 and 27 with a diaphragm 28 therebetween and the chambers are connected to the line 16. A branch 16a from the conduit 16 is connected to one of the closures 7 to supply air under pressure to the cavity in the engine block 2 and the opposite side of the engine block is sealed by a closure 7a. Conduit 16 and branch 16a are vented to the atmosphere through a branch 16b. A normally-open divide valve 29 is provided in the conduit 16 between the branches 16c and 16d connecting the conduit 16 to the separate chambers 26 and 27 of the measuring instrument 24. Divide valve 29 when closed isolates the ballast chamber 25 and chamber 27 of the measuring instrument from the remainder of the testing circuit including the other chamber 26 of the measuring instrument and part to be tested. A normally-open dump valve 30 is provided in the branch line 16b for venting the conduit 16 to the atmosphere. Thus, only the valves 19, 29 and 30 are required to perform a testing operation.

To perform a leak test, the dump valve 30 is closed and the fill valve 19 is opened to supply air at 45 pounds per square inch through the conduit 16 and branch 16a to the cavity in the engine block 2. The air simultaneously flows into the ballast chamber 25 and chambers 26 and 27 of the measuring instrument 24. If a pressure of 35 pounds per square inch does not occur within a predetermined period of time due to a large leak in the part, the contact 20a of the high pressure switch 20 does not open which immediately terminates the test. When a pressure of 45 pounds per square inch does occur in conduit 16, the contact 20a does open and contact 20b of the high pressure switch 20 closes and operating through a control circuit, later to be described, initiates the next step in the testing operation by closing the rapid-fill valve 19 and opening the dump valve 30. Dump valve 30 then bleeds testing fluid from the chambers 26 and 27 of the measuring instrument 24 and part 2 to be tested until a low pressure of 35 pounds per square inch occurs in the conduit 16 and closes the low pressure switch 21. Switch 21 operates through the control circuit to again close dump valve 30 and to trap the air at that pressure in the interior of the part to be tested for a period of time, as measured electronically, to permit the pressure to stabilize. The divide valve 29 is then closed to isolate the ballast tank 25 and chamber 27 of the differential pressure measuring instrument 24 from the chamber 26 and cavity in the part 2 being tested. The divide valve 29 is maintained closed for a predetermined period of time as measured electronically, for example, five seconds, during which time any leak in the engine block 2 will produce a difference in pressure in the chambers 26 and 27 of the measuring instrument 24 and a movement of the diaphragm 28 to the left as viewed in FIGURE 2.

The testing apparatus of the present invention provides an extremely compact arrangement having a minimum number of elements which are all mounted in a cabinet 34, as shown in FIGURE 3. This cabinet 34 is portable and placed closely adjacent the station 3 of the conveyor, see FIGURE 1, where the parts are to be tested. A fluid supply line 15, see FIGURE 2, leads into the cabinet 34 to supply fluid thereto at 125 pounds per square inch and the branch 16a leads from the cabinet to the closure 7 for closing the parts to be tested. All of the other parts of the testing apparatus are located in the cabinet 34 to reduce the length of the connecting lines therebetween to a minimum, and especially the lines 16c and 16d between the measuring instrument 24 and the ballast tank 25. Due to the short lengths of the connecting lines between the elements, less time is required to stabilize the pressure throughout the testing system and a more accurate measurement may be made by any differences resulting from a leak in the part being tested.

As shown in FIGURE 3, the front of the cabinet has three window openings 35, 36 and 37 at the left hand side for indicating the particular steps as the testing operation proceeds, such as "fill" and "stabilize" and "test" and one of the three signs is illuminated during the test to indicate the progress of a test. At the right hand side of the cabinet 34 there are three other window openings 38, 39 and 40 with signs therein indicating a "large leak" or a "small leak" or "accept" and one of the three signs will be illuminated after a test to indicate one of the three conditions. Between the window openings in the center of the cabinet 34 is a meter 41 for indicating a difference in pressure and the amount of pressure difference resulting from a leak. A knob 42 of a controller 43, later to be explained in more detail, is provided for adjusting the pressure difference which the measuring instrument senses to indicate a leak. Another knob 44, which actually represents a plurality of knobs is provided for adjusting the resistance of the RC networks of timing branch circuits and thereby adjusts the period of time for a particular step of the method.

The arrangement of the principal elements of the testing apparatus in the cabinet 34 is illustrated in FIGURE 4 as comprising the meter 41, the controller 43 having knob 42, a manifold block 45 in which the conduits 16, 16a and 16b are formed as passageways, and the measuring instrument 24. The other elements of the testing apparatus such as the air filter, pressure regulator switches 20 and 21 are not shown to provide a clear illustration of those parts that are shown. In addition, the cabinet includes separate compartments for each of the window openings 35 to 37 and 38 to 40 which contain electric lamps 35L to 40L. Cards having printed circuits with the electronic elements mounted thereon (not shown) are located in the cabinet 34 forwardly of the manifold block 45. The electronic elements and the circuits automatically control the steps of a testing operation, as later explained in more detail.

The manifold 45 is in the form of a block of metal, such as aluminum, and is shown in detail in FIGURES 4 to 7. The manifold block 45 is of rectangular shape and may be made as small as 9.5 inches high, 5.5 inches wide and 2 inches thick. The ballast tank 25 is formed as a cylindrical cavity bored in the block and closed by a plug 48 inserted in the open end as shown in FIGURES 5 to 7. The main conduit 16 of the fluid system in the manifold block 45 is formed by a vertical passageway drilled from the bottom edge of the block as shown in FIGURE 5. Branch conduit 16a is formed as a passageway in the manifold block 45 by a hole drilled into the block from the right hand side as shown in FIGURE 5 and into the top of the ballast chamber 25. The horizontal extension of branch conduit 16a beyond the vertical main conduit 16 and into the ballast cavity 25 becomes part of the main conduit 16. The branch 16b of the fluid testing circuit is formed by a passageway drilled into the manifold block 45 from the right hand side as viewed in FIGURE 5 until it intersects the vertical passageway 16. Each of the passages 16, 16a and 16b are located midway between the front and rear of the block as shown in FIGURES 6 and 7. The open end of the vertical passageway 16 forms a port 49 at the bottom of the manifold block 45 for connection through an external pipe to the pressure regulator 18, the passage 16a provides a port 50 for connection to the closure 7 of the workpiece 2 to be tested by a flexible conduit and the passage 16b forms a port 51 through which air is exhausted to the atmosphere. In addition, the manifold block 45 has passages 52 and 53 drilled from the rearward side of the block as viewed in FIGURE 5 and directly into the ballast chamber 25 and passageways 16a, respectively. Passages 52 and 53 provide ports 54 and 55 for connecting the short lead conduits 16c and 16d to the chambers 26 and 27 in the measuring instrument 24, see FIGURE 2.

Another feature of the present invention is the kind and location of valves 19, 29 and 30 which project through the manifold 45 for controlling the flow of fluids therein and which open and close without displacing fluid on either side thereof. To this end, the manifold block 45 has three tapered holes 56, 57 and 58 extending from the rear of the block toward the front as viewed in FIGURE 5 with cylindrical counterbores 56a, 57a and 58a at the forward ends. Correspondingly shaped tapered valves 19, 29 and 30 extend through the manifold block and have movable valve elements there in alignment with the passageways 16 and 16b to be controlled. As all three of the valves are of identical construction, a description of one should suffice for the others.

Each of the valves 19, 29 and 30, as shown in FIGURE 10, comprises a conical housing 60 with screw threads cut in its smaller end 61. A nut 59 screwed on the threaded end 61 of the valve housing 60 in the counterbore clamps the valve housing in position in its hole 56, 57 or 58 in the manifold block. The valve housing 60 has a cylindrical bore 62 of a size to receive a movable valve element in the form of a ball valve 63. The rotating ball valve 63 also has a cylindrical bore 64 to provide a passage for the flow of fluid therethrough and a slot 65 in its periphery located in a plane normal to the cylindrical bore 64. Mounted on either side of the ball valve element 63 are valve seats in the form of detachable rings 66 and 67 of an anti-friction material such as "Teflon" and have a conical surface 69 at one side corresponding to the taper of the valve housing 60 and a spherical face at its opposite side for engaging the surface of the ball. A valve stem 70 extends through an axial bore 71 in the bottom of the valve housing 60 and has a projecting key 72 at its inner end for engaging the slot 65 in the ball valve element 63 and a key 73 at its outer end for engagement with an actuator. In addition, the valve body 60 has ring gaskets 74 and 75 in peripheral grooves therein above and below the cylindrical bore 62.

As shown in detail in FIGURE 6, the tapered valves 19, 29 and 30 extend through the manifold block 45 and form a tight fit with the correspondingly shaped tapered holes 56, 57 and 58 in the block 45 and are fastened therein by the nuts 59 screwed onto the threaded nut 61 of the valve housing. Each valve housing 60 is sealed on opposite sides of the conduit which it controls by the gasket rings 74 and 75. The movable ball element 63 of the valve is located in the valve housing 60 as shown in FIGURES 7 and 9 in alignment with the passage 16 in the block which it controls and with the valve seat rings 66 and 67 in the cylindrical bore 62 of the valve housing engaging its opposite sides. When the ball valve element 63 is moved to a right angular position from the full line to the dotted line positions shown in FIGURE 9 the solid peripheral portions 77 and 78 of the ball overlie and close the passage 16. The ball valve element 63 is turned by its valve stem projecting outwardly from the side of the manifold block 45 through the axial bore 71 of the conical housing 60, see FIGURE 10, which has its key 72 engaging the keyway slot 65 in the ball element.

The valve stems 70 of the valves 19, 29 and 30 are rotated by a mechanical actuator 80 such as a fluid operated motor. Such mechanical actuators 80 do not produce heat as do magnetic windings which are apt to transfer heat to the manifold block 45 by conduction and vary the temperature of the fluid therein from that in the remainder of the system and thereby affect the accuracy of the measurement of pressure differences. As shown in FIGURES 4 and 7 the fluid motor actuators 80 are mounted directly on one side of the manifold block 45 with the driving shafts 81 interlocked with the key 73 on the valve stem 70. The fluid motor actuators 80 may have any suitable construction and in the illustrated embodiment as shown in FIGURE 8 comprise a cylindrical casing 82 and vane type piston 83 forming chambers 84 and 85 at opposite sides thereof. Fluid supply conduits 86 and 87 are connected to the chambers 84 and 85, respectively, and the fluid to the chambers may be controlled by any suitable control mechanism such as the piston type valve illustrated in FIGURE 8. This piston type valve mechanism comprises a cylindrical housing 88 to which the conduits 86 and 87 are connected. A supply pipe 89 is connected to the center of the housing 88 through which fluid under pressure is supplied thereto and exhaust pipes 90 and 91 are connected to its opposite ends. The movable valve element has spaced pistons 92 and 93 fixed on a rod 94 and so arranged that in one position the pipe 89 is connected to conduit 86 and to the chamber 84 in the motor between the pistons while the other conduit 87 is connected to the exhaust pipe 91 at the opposite side of piston 93. In the other position of the piston valve the pistons 92 and 93 connect pipes 89 and 87 to supply fluid under pressure to the chamber 85 and connect the chamber 84 and conduit 86 to the exhaust pipe 90. A spring 95 acts between the end of the housing 88 and piston 93 to move it in one direction, such as that in FIGURE 8, and a solenoid winding 96 acts on a valve stem 97 projecting from the housing to move the pistons 92 and 93 to the right against the action of the spring.

In addition, the high and low pressure switches 20 and 21 are incorporated in an element 98 mounted on the side of the manifold block 45, see FIGURE 5, and connected to the passageway 16 in the block through the hole 99.

The measuring instrument 24 is also mounted on the rear of the manifold block 45 and closely adjacent thereto by the connections 16c and 16d as previously explained. The short length of the connecting conduits 16c and 16d reduce the length of the columns of air between the parts and the measuring instrument as shown most clearly in FIGURE 7. The divide valve 29 is positioned in a right angular extension of the conduit 16 between the branch conduits 16c and 16d leading to the separate chambers 26 and 27 of measuring instrument to isolate ballast cavity 25 and chamber 27 from chamber 26 and the part 2 to be tested. FIGURE 7 also shows the valve actuator 80 for the divide valve 29 on one side of the manifold block 45 and the measuring instrument 24 located closely adjacent the other side so that by turning the ball element 63 of the valve, the conduit 16 between the conduit branches 16c and 16d is closed.

FIGURE 11 diagrammatically illustrates the measuring instrument 24 comprising the chambers 26 and 27 at opposite sides of the diaphragm 28. At opposite sides of the diaphragm 28 are electrode plates 102 and 103 mounted on stems in the side walls of the chamber and connected by electric lines 104 and 105 to *electrodes 102a and 103a in an envelope containing a gas ionized by* an oscillating generator 106 [in the form of a vacuum tube] for producing a 50,000 cycle alternating current. The generator 106 ionizes *the gas between the electrodes 102a and 103a and* the space between the electrode plates 102 and 103 *and diaphragm constitute capacitors* and when the diaphragm 28 is centrally positioned between the plates the electrode plates are equally charged. However, as the diaphragm moves to the left in FIGURE 11, due to a leak in the part 2 to be tested, the plate 102 becomes more highly charged than plate 103. This difference in charge on the electrodes 102 and 103 produces a transient current voltage as *described in United States Letters Patent to K. S. Lion et al. Nos. 2,696,556 and 2,696,584 issued Dec. 7, 1954, and entitled "Electric Transducer System" and "Electric Circuit" respectively,* which is directly proportional to the degree of displacement of the diaphragm 28 which, in turn, is directly proportional to the difference in pressure in the chambers 26 and 27. Thus, the measuring instrument 24 constitutes a transducer which converts mechanical movement to an electric potential. The change in potential, due to deflection of the diaphragm 28, is converted into a current flow by the cathode follower 107 which, in turn, is connected to an electric bridge 108. The bridge 108 has resistances 109 and 110 connected to opposite sides of output lines 111 and 112 of the cathode follower 107 which are connected to each other at the junction 113, and a variable resistance 114 across the line has a tap contact 115. Variable resistance 114 and its tap contact 115 form, in effect, an adjustable potentiometer. Thus, any transient voltage generated will be transmitted from the bridge through lines 116 and 117 from the tap contact 115 and junction 113. This difference in voltage is used to automatically indicate a leak in the part being tested. The position of the tap contact 115 of the bridge 108 may be adjusted by the knob 42 as previously described, see FIGURE 3, and the further toward the line 111 that the tap is initially adjusted, as viewed in FIGURE 11, the larger will be the leak that can be detected. In addition, the meter 41 is connected across the lines 111 and 112 and will indicate a leak visually.

FIGURE 12 diagrammatically illustrates the electric circuit of the present invention for automatically initiating and controlling the performance of the steps of an entire testing operation. The steps of the testing operation are performed in a predetermined timed sequence and all mechanical switches except the pressure operated switches 20 and 21 are eliminated to increase the speed with which the testing steps are performed and to increase the reliability of operation. The control elements are all of the solid state type comprising semiconductors which resist the flow of current until energized by an electric pulse and then "fire" to permit current flow until the gate or emitter becomes negative at which time they again resist and shut off the flow of current. The semiconductor current control devices used in the control circuit include silicon control rectifiers which are fired at a predetermined threshold voltage and continue to conduct after once started, and unijunctional transistors which are much more critical to an impressed starting and stopping voltage at which they conduct and shut off current flow. The control elements also include silicon control diodes which permit flow of electric current in one direction only to protect the rectifiers and transistors.

The circuit, in general, comprises a plurality of branches connected in parallel between lines L1 and L2 of a DC source as, for example, 24 volt. Certain of the branch circuits comprise a plurality of timing RC networks 120, 121 and 122 corresponding to the filling, stabilizing and testing steps, each of which require a predetermined period of time; current responsive branches of actuating instrumentalities, such as valves 19, 29 and 30 required for performing the testing steps; current responsive branches for indicating the various steps of the testing operation; current responsive branches for indicating the results of the test; and the interconnections between the various branches to energize the timing and current responsive branches in the proper timed sequence and for indicating the various steps of the testing operation and results of the leak test. In the following description the value of the resistors R and capacitors C used in a particular circuit will be given, but it will be understood that these values may be changed for particular installations.

The timing branches 120, 121 and 122 for controlling the timed period for filling, stabilizing and testing, respectively, are identical so that a description of the one for controlling the filling operation, and indicated by the subscript (1), will suffice for the others. The RC network for the timing branch 1, for example, includes a variable resistor R–1b of 100,000 ohms and a capacitor C–1 of 50 microfarads. The variable resistor R–1b is adjustable by turning knob 44, see FIGURE 3, to vary the time period for filling between, for example, 1 and 5 seconds. The resistor R–1b and capacitor C–1 are connected in series across the 24 volt line and the emitter E of a unijunctional transistor T–1 is connected between the resistor and capacitor. Balancing resistors R–1c and R–1d of 270 and 50 ohms, respectively, are connected between the bases B–1 and B–1a of transistor T–1 and opposite sides of the line. The elements of the timing branches 121 and 122 are indicated by the same reference characters as the timing branch 120 with subscript 2 and 3, respectively. Each of these timing branches takes a predetermined period of time to charge the capacitor to the potential at which transistor conducts current.

A current responsive indicating device such as an electric lamp 35L, 36L, 37L is connected in parallel with each timing branch 120, 121 and 122, respectively, for illuminating the signs indicating the fill, stabilize and test steps.

All of the other current responsive devices are connected in parallel branches, generally designated 4 to 13, between the lines L–1 and L–2 and these branches include control as well as current responsive devices. For example, the solenoid coils for operating the fill valve 19, divide valve 29 and dump valve 30 are connected in branch circuits Nos. 4, 7 and 6, respectively, and are indicated by reference characters S–19, S–29 and S–30. Also current lamps 38L, 39L and 40L for indicating the result of a test are shown connected in branch circuits 11, 12 and 13. Thus, when any of the lamps 38L, 39L or 40L is energized it will illuminate the sign in corresponding window 38, 39 or 40 in the cabinet 34, see FIGURE 3, to show a large leak, a small leak or an accept signal.

A leak sensing circuit branch 123 responsive to variations in the electrical output from the measuring instrument 24 and bridge circuit 108, see FIGURE 11, is connected between the branch 122 for timing a test period and the current responsive branch 12 including the indicator lamp 39–L for indicating a small leak. The sensing circuit comprises a unijunctional transistor T–14 having an emitter E–14 connected to the tap 115 from the bridge circuit 108 through a line including a directional diode D–14 and capacitor C–14 of 0.2 microfarad connected in series. One end of the line is connected to output line 117 from generator 106 at the junction 113 of the bridge 108 and including a resistor 118 of 10,000 ohms and the opposite end of the line is connected to line L–1. Output line 117 also is connected to a second capacitor C–14a of 0.01 microfarad in parallel with capacitor C–14 and between diode D–14 and capacitor C–14a the line is connected to the emitter E–14 of the transistor T–14. Transistor T–14 has a circuit including balancing resistors R–14 and R–14a of 5,000 ohms each and a variable resistor R–14b of 5,000 ohms therebetween and connected between branch circuit 3 and line L–1. Resistors R–14c and R–14d of 270 and 100 ohms, respectively, are connected between the bases of the transistor T–14 and output from branch 3 and line L–1 in parallel with resistors R–14 and R–14a. Also in parallel with the resistors and across the line including the transistor T–14 is a voltage regulator VR–14 to maintain a constant voltage difference applied to the opposite bases of the transistor. A resistor R–14f of 470 ohms is connected between transistor circuit and the branch circuit 3.

The circuit will now be described by the functions it performs so that in addition to describing the circuit the mode of operation of the testing apparatus also will be described. When a part 2, such as an engine block, engine head, manifold or any other part having a cavity, see FIGURE 1, is to be tested for leaks it is brought into place at the station 3 and sealed and the movement of closure 3 actuates the start switch 12 to initiate operation of the leak testing apparatus. As shown in FIGURE 12, the start switch 12 is normally connected to the opposite side of the line through a resistor R–15 to charge the capacitor C–15. When the switch 12 is actuated by closure operator 11, the charge in the condenser C–15 will be directed as an electric pulse through line 124 and 124a to resistor R–10 of 1,000 ohms and diode D–10 of branch circuit 10 to the gate G of silicon control rectifier Q–10 therein. Pulsing of rectifier Q–10 causes it to fire and produce current flow from line L–2 to L–1 through the branch 10 including resistor R–10b of 1,000 ohms. Branch 10 also includes a resistor R–10a of 1,000 ohms to protect the rectifier from reverse flow through the branch. Current flow through branch 10 charges capacitors C–11, C–12 and C–13 of 3.0 microfarads each which puts a negative bias on the silicon control rectifiers Q–11, Q–12 and Q–13 in branches 11, 12 and 13 to shut off current flow therein. Thus, all lamps 38L, 39L and 40L in the branches 11, 12 and 13 will be extinguished.

Simultaneously, a pulse will be directed from line 124a to gate G of silicon control rectifier Q–9. When rectifier Q–9 fires current will flow through branch 9 including resistor R9 of 1,000 ohms to connect line L–2 to its extension L–2a. Thus, one end of all of the branches 1 to 8 will be connected to line L–2. Branch 9 also includes resistances R–9a and R–9b of 1,000 ohms each.

Also, the pulse from line 124a will be directed to the gates G of silicon control rectifiers Q–4 and Q–6 in branches 4 and 6 having resistors and diodes the same as in branch 9. Firing of rectifiers Q–4 and Q–6 produces a current flow through the branches 4 and 6 including the solenoid windings S–19 and S–30 for operating the fill valve 19 to open position and the dump valve 30 to closed position, see FIGURE 2.

Lastly, the actuation of switch 12 directs a pulse through line 124b to the gate G of the silicon control rectifier Q–1 through resistor R–1 of 1,000 ohms and the isolating diode D–1. Firing of rectifier Q–1 produces a current flow through the electric lamp 35–L to indicate that a filling step is being performed. Branch 1 has a resistor R–1a of 1,000 ohms to protect the rectifier Q–1, the same as branches 4, 6 and 11 to 13. The firing of the rectifier Q–1 also energizes the RC network of timing branch 120.

With the fill valve 19 and divide valve 29 open and dump valve 30 closed, air under pressure flows through the conduits 16 and 16a, see FIGURE 2, to fill the chambers 26 and 27 of the measuring instrument 24, ballast tank 25 and cavity in the part 2 being tested. If the part 2 being tested has a large leak which prevents an increase in pressure in the conduit 16 within, for example, 5 seconds, transistor T–1 of the first timing device 120 fires and transmits a pulse through the line conductor 127 and contact 20a of the pressure responsive switch 20 and then through the resistor R–11 and diode D–11 to the gate G of a silicon rectifier Q–11 in the branch circuit including the electric lamp 38–L. This branch circuit 11, like the others, has resistance R–11a of 1,000 ohms and a resistance R–11b of 47 ohms. Firing of rectifier Q–11 causes current flow through the electric lamp 38L to illuminate the sign indicating a "large leak" in the part being tested. Current in branch 11 also flows through the isolating diode D–11a and line conductor 128 to gate G of a silicon control rectifier Q–8 in branch 8. This branch includes resistances R–8a and R–8b of 1,000 ohms and is connected through capacitor C–9 to the branch 9 circuit including the rectifier Q–9. Current flow through the branch 8 changes the potential in the branch 9 and shuts off the flow of current through the latter. Such interruption in the current flow from the line L–2 to its extension L–2a opens the branches 1 to 7 including the solenoid windings S–19 and S–30. Deenergization of solenoids S–19 and S–30 closes the fill valve 19 and opens dump valve 30. In other words, all of the branch circuits are returned to their initial positions except 11 which remains energized and indicates a large leak.

If after initiation of a test the pressure of the testing fluid increases sufficiently to open the contact 20a of the switch 20 before the transistor T–1 of the timing circuit 120 times out and fires, the branch circuit 11 will not become energized which indicates that no large leak exists in the part 2 being tested. Contact 20b of the pressure switch 20a is normally connected through the resistance R–16 of 1,000 ohms to capacitor C–16 of 3.0 microfarads and when actuated by the increase in pressure to engage its other contact it transmits an electric pulse from capacitor C–16 through the line 129 to gate G of the silicon control rectifier Q–2 in branch No. 2 to cause it to fire and light the lamp 36–L indicating a stabilizing step. Current flow in branch 2 acts through a line 130 between branches 1 and 2 having a capacitor C–1a of 3.0 microfarads which produces bias on branch 1 and shuts off current flow therein and extinguishes lamp 35–L. Firing of the rectifier Q–2 also energized the RC network of timing circuit 121.

Simultaneously, contact 20b of the pressure switch 20 delivers an electric pulse through the line 128a to gate G of the silicon control rectifier Q–5 to produce a flow of current to branch circuit 5. Branch circuit 5 is connected to the branch circuits 4 and 6 through capacitors C–4 and C–6 of 3 microfarads which produces a negative bias on the rectifiers Q–4 and Q–6 to shut off current flow in these branches. The interruption of current flow in branches 4 and 6 deenergizes the solid winding S–19 to close the fill valve 19 and solenoid S–30 to open the dump valve 30.

Pressure fluid then bleeds from the pressure testing system through the open dump valve 30 until the pressure falls to some lower pressure of, for example, 35 pounds per square inch at which time the contact of the switch 21 is actuated. Switch 21 in its high pressure position is connected to the positive side of a powerline through a resistance R–17 of 1,000 ohms to charge a capacitor C–17 of 3.0 microfarads. When the switch 21 is actuated to the lower pressure position, capacitor C–17 delivers a pulse through the line conductor 131 to gate G of the silicon control rectifier Q–6 in branch 6 including the solenoid S–30 for the dump valve 30. Firing of the rectifier Q–6 energizes the solenoid S–30 to again close the dump valve 30.

A predetermined time period after Q–5 fires to close the dump valve 30 and the fluid pressure has become stabilized throughout the system, the RC network of the stabilizing branch 121 will produce a voltage on the emitter E of the transistor T–2 which will cause it to fire. Firing of the transistor T–2 produces a current flow through the line conductor 132 to the gate G of the silicon control rectifier Q–3 in branch 3 to cause it to fire and conduct current through the lamp 37–L indicating that a testing step has been initiated. Firing of the rectifier Q–3 first sends a pulse through the line 133 to the condenser C–2a to put a bias on the rectifier Q–2 and stop current flow through the lamp 36–L. Firing of rectifier Q–3 also energizes the RC network of the timing circuit 122. Firing of the rectifier Q–3 also delivers a pulse through line 134 to the gate G of rectifier Q–7 causing it to fire and conduct current through branch 7 including the solenoid S–29 of normally-open divide valve 29 (see FIGURE 2). Closing of divide valve 29 then segregates the ballast tank 25 and chamber 27 of the testing element 24 from the remainder of the pneumatic testing system so that the opposite chamber 26 of the testing element is connected to the cavity in the part 2 being tested. Firing of the rectifier Q–3 also directs current through the branch line 134a and resistance R–14f to energize the sensing circuit including the transistor T–14.

Any deflection of the diaphragm 28 of the measuring device 24 resulting from a small leak in the part being tested produces a transient voltage in the cathode follower 107, see FIGURE 11, and thereby produces a difference in potential between the lines 116 and 117 which is impressed on the emitter E of the transistor T–14. When this potential rises to a predetermined value for which it is set the transistor T–14 fires and produces a current flow through the line 135 to the gate G of the silicon control rectifier Q–12 to cause it to fire. Firing of the rectifier Q–12 produces a current flow through the branch 12 including the lamp 39L to indicate that a small leak exists. Branch circuit 12 has a resistance R–12b of 47 ohms between the rectifier and side L–2 of the line and a parallel line is connected through a diode D–12a to the conductor 128. A pulse is then transmitted through line 128 to gate G of rectifier Q–8 in branch 8 and acting through the capacitor C–9 shuts off the current flow through branch 9 and thereby disconnects the extension L–2a from line L–2. Deenergization of line L–2a returns all of the circuits 1 to 8 and instrumentalities actuated thereby to their initial position.

If no leak exists in the part being tested, no transient current is produced in the sensing circuit, see FIGURES 11 and 12, so that no pulse is transmitted to the emitter of the transistor T–14 in the testing circuit sufficient to cause it to fire. When the transistor T–3 in the RC timing circuit 122 fires, a pulse is transmitted through the line conductor 136 to the gate G of the rectifier Q–13 in the branch circuit 13. Rectifier Q–13 then fires conducting current through the lamp 40L indicating no leak in the part 2 being tested. Branch circuit 13 includes a resistance R–13b of 47 ohms between the rectifier Q–13 and opposite side of the line L–1 and in parallel with the resistance R–31b is a line connected to the line 128 for firing the rectifier Q–8 in branch 8 to interrupt current flow from the line L–2 to extension L–2a, as previously described, to terminate the testing operation. All of the branches Q–1 to Q–9 are then deenergized and the elements controlled thereby are returned to their initial position. Upon deenergization of the branches 6 and 8 the dump valve 30 and divide valve 29 open to reduce the pressure in the fluid system to zero at which time the pressure switches 20 and 21 are returned to their initial position, illustrated in FIGURES 2 and 12. The only circuit which remains energized is the one indicating that the part has no leak. The testing apparatus will remain in this condition until the next part to be tested is moved into the testing zone 3 to again actuate the switch 12 to initiate another test.

FIGURE 13 illustrates a modified circuit diagram which provides an additional circuit branch for indicating a leak in a part being tested. On rare occasions a part may have a leak which is small enough to cause the high pressure switch contact 20a to open, but permit a sufficient amount of the fluid testing medium to escape during stabilization to approach atmospheric pressure at the time the divide valve 29 closes. The pressure in the cells 26 and 27 of the measuring instrument 24 then will be equal and therefore, will not indicate a small leak.

The modified circuit arrangement illustrated in FIGURE 13 will indicate such intermediate leaks as well as large and small leaks. The circuit arrangement illustrated in FIGURE 13 is identical with that illustrated in FIGURE 12 except that an additional branch line 200 is provided between the rectifier Q–2 for energizing the stabilizing circuit 2 and rectifier Q–11 in the responsive circuit 11 for indicating a large leak. Included in the branch 200 is a resistance R–200 of 2200 ohms and a low pressure switch 21a which closes at some pressure below the pressure at which switch 21 closes as, for example, 30 pounds per square inch. For purposes of illustration the low pressure switch 21a is shown as one contact of the low pressure switch 21, but it will be understood that it could be a separate switch.

Thus, if the pressure of the testing fluid maintains switch contact 20a open during a filling operation and operates switch contact 20b to energize the stabilizing branch 2, but during the period of stabilization the pressure in the system falls below 30 pounds per square inch, the switch contact 21a will close. Closure of the switch contact 21a completes a circuit through the branch 200 to pulse silicon control rectifier Q–11. Firing of rectifier Q–11 energizes the responsive circuit including lamp 38L to indicate a large leak. In other words, the branch circuit 200 is connected in parallel with the line conductor 127 to the rectifier Q–11 so that failure of the pressure testing medium to open high pressure switch contact 20a or to maintain low pressure switch contact open will indicate a leak.

FIGURES 14 to 16 illustrate a manifold block 245 of modified construction which further reduces the time required to stabilize at a fixed pressure, reduces the number of turns in the tortuous paths of flow of the testing fluid as well as the length of paths, reduces the possibility of surging, provides a more symmetrical arrangement and simplifies the construction for manufacture. The block 245 has passages 216, 216a and 216b the same as 16, 16a and 16b in FIGURE 5, openings 249, 250 and 251 in the edges of the block the same as openings 49, 50 and 51 in FIGURE 5, valves 219, 229 and 230 the same as valves 19, 29 and 30 in FIGURE 6 and a ballast cavity 225 the same as cavity 25 in FIGURE 5. However, the passages, openings, valves and ballast cavity have a different arrangement and relationship in FIGURES 14 to 16 than they do in FIGURES 4 to 7.

In the modified arrangement illustrated in FIGURES 14 to 16 passageways 216 and 216b are drilled as one hole lengthwise of the block 245 throughout its length. The cavity 225 is drilled in the block in parallel relation to the passageway 216. With this modified arrangement the end of the cavity 225 is closed by a cover plate 248 attached to the block by screws 246 and having an O-ring seal 247 between the cover and block. A third passageway 216a is drilled through the manifold block 245 in a direction transversely of the passageways 216 and 225 and intercepts the latter passageway. Passageway 216a is connected to the part to be tested and the passageway 216b is connected to the atmosphere the same as in FIGURES 2 and 5; and the fill valve 219 extends through the block transversely of passageway 216, the divide valve 29 is located in passageway 216a between the part to be tested and the cavity 225 and the dump valve 230 is located in passageway 216b. Passageways 216c and 216d extend through the manifold block 245 into the passageway 216a at opposite sides of the divide valve 229.

With the modified manifold block 245 of FIGURES 13 to 15 testing medium supplied through the fill valve 219 is divided at the junction between passages 216 and 216a and flows in two directions to the part being tested and ballast chamber 225. The testing medium enters the ballast chamber 225 at the center and flows toward opposite ends so that any surging will occur only in the chamber. When the dump valve 230 is opened the testing medium flows from the ballast chamber 225 and part being tested toward each other and then out through passageway 216a to further reduce surging during stabilization period. The central location of the divide valve 229 at the approximate center of the manifold block 245 also reduces any variations in temperature at the place where pressure variations are being measured. The arrangement of passages 216, 216a and 216b in the manifold block 245 reduces the length of the passages and number of turns in the paths of flow. Furthermore, the arrangement reduces the number of holes which must be drilled in the plane of the block to three to reduce the cost of manufacture.

It will now be observed that the present invention provides an improved leak testing apparatus which is more sensitive in detecting leaks more quickly responsive to indicating a leak. It will also be observed that the apparatus of the present invention will automatically test a part in a shorter period of time with excellent reproducibility than has been possible with prior leak testing apparatus. It will further be observed that the present invention provides an improved electric testing apparatus which reduces errors resulting from variations in the ambient and produces a stabilized condition more quickly for accurate measurement of any leaks in the part being tested. It will also be observed that the present invention provides an electric testing apparatus which may be easily and quickly adjusted to vary the magnitude of a leak to be indicated. It will further be observed that the present invention reduces the number of moving parts to a minimum and thereby reduces the hysteresis to thereby reduce the chance of error due to failure of mechanically moving mechanisms. It will still further be observed that the present invention provides a leak testing apparatus for automatically performing a leak testing operation which is of extremely simple and compact construction, economical to manufacture and one which is extremely rapid and reliable in indicating leaks in the part being tested.

While several embodiments of the invention are herein illustrated and described it will be understood that changes may be made in the construction and arrangement of elements without departing from the spirit and scope of the invention. For example, the electronic timing, sensing and responsive circuits for controlling a testing operation and indicating results can be used in other testing apparatus having different combinations and arrangements of elements as by providing separate chambers for the valves and ballast tank instead of mounting them all on the manifold block. Therefore, without limitation in this respect the invention is defined by the following claims.

We claim:

1. An apparatus for testing parts for leaks comprising a measuring instrument having separate chambers with a diaphragm therebetween, a source of fluid under pressure, a manifold block having passages and a ballast chamber therein, one of said passages connecting the source of pressure fluid to the ballast chamber, a second passage connecting said one passage to a closed chamber on the part to be tested, a third passage connecting the first passage to the atmosphere, fourth and fifth passages connecting the separate chambers of the measuring instrument to the first passage adjacent to the ballast chamber, a normally closed fill valve in the first passage for filling all of the passages with a testing fluid from said pressure source when the valve is open, a normally open divide valve in said first passageway between the fourth and fifth passages to isolate one chamber of the measuring instrument and ballast chamber from the remainder of the system, a normally open dump valve in the third passage for sealing the system when closed and dumping air from the system when open, said valves extending through the manifold block and having rotary valve elements in alignment with the passages which they control, a mechanical valve actuator for each valve, pressure operated switches connected to the first passage in said manifold block, a sensing mechanism having a transducer for producing an electric potential in a branch circuit proportional to any movement of the diaphragm in said measuring instrument, and an electric control circuit having timing branches for timing the steps of filling, stabilizing and testing, circuit branches including electric solenoids for controlling operation of the valves, circuit branches having current responsive indicating devices for indicating the results of the test, connections between the timing branches, current responsive branches and sensing branch, and each of branch circuits having solid state semiconductors for controlling current flow therein.

2. An apparatus for testing parts for leaks comprising a measuring instrument having separate chambers with a movable diaphragm therebetween, a ballast chamber, a source of fluid under pressure, conduits connecting said chambers, a fill valve for controlling the supply of fluid from said source to the separate chambers of the measuring instrument, ballast chamber and part being tested, a divide valve for isolating one of the chambers of the measuring instrument and ballast chamber *from the other chamber* of the measuring instrument and part being tested, a dump valve for exhausting fluid from all of the chambers to the atmosphere, a sensing mechanism having a transducer for producing an electric potential in a branch circuit proportional to any movement of the diaphragm resulting from a difference in pressure in the chambers of the measuring instrument, and an electric control circuit comprising timing branches each having an RC network and solid state semiconductor, means responsive to the firing of the solid state semiconductor of each RC network at the end of its timing period to pulse the semiconductor element in the RC network of the next branch for timing the steps of filling, stabilizing and testing, current responsive branches including elements for controlling operation of the valves and indicating the results of the test, each of said responsive branch circuits having a solid state semiconductor for controlling the current flow therein, and the semiconductors in at least some of the current responsive branches being electrically connected to be pulsed by the timing branches to automatically fill, stabilize and leak test the part for leaks.

3. Apparatus for testing parts for leaks in accordance with claim 2 in which the valves have rotary valve elements to open and close conduits without displacement of fluid therein, and a mechanical valve actuator for each of the valves.

4. In an apparatus for testing parts for leaks of the type including a measuring instrument having separate chambers with a diaphragm therebetween, a source of fluid under pressure, conduits connecting the source of fluid to the chambers of the measuring instrument and a cavity in the part being tested, valves for filling the chambers, stabilizing the fluid pressure therein and then isolating one of the chambers of the measuring instrument from the other chamber and cavity in the part being tested, that improvement comprising a sensing mechaniism having a transducer for producing an electric potential proportional to any movement of the diaphragm in said measuring instrument, an electric circuit having a sensing branch with a solid state semiconductor connected to the transducer, said solid state semiconductor being nonconductive until an electric potential is impressed thereon, a responsive branch having a solid state semiconductor and an electric responsive indicator therein, said semiconductor in the responsive branch being nonconductive until an electric potential is impressed thereon, connecting means between the sensing branch and responsive branch of the electric circuit whereby an electric potential from the sensing branch sufficient to fire the semiconductor therein impresses a potential on the semiconductor in the responsive branch to cause it to fire and produce a current flow in the electric responsive circuit, and a circuit branch having an RC network connected to the sensing branch to control the time period during which its semiconductor can fire and produce a current flow in the responsive branch.

5. An apparatus for testing parts for leaks of the type comprising a manifold block of a heat conductive material and having a ballast chamber formed therein, a measuring instrument having separate chambers with a diaphragm therebetween and located adjacent said manifold block, a source of fluid under pressure, conduit means connecting said elements comprising a first conduit in said block for connecting said source of fluid to said chambers of the measuring instrument and part being tested, a second conduit in said block for connecting said first conduit to the atmosphere, a fill valve in said first conduit in said block for controlling the supply of fluid from said source to all of the chambers, a divide valve for isolating one of said chambers of the measuring instrument and ballast chamber in the manifold block from the other chamber of the measuring instrument and part being tested, a dump valve in the second conduit for controlling the exhaust of testing fluid from the chambers, said manifold block having a front, back and sides, the conduits in said block being formed by holes drilled in said block from the sides, and the valves extending through the block from the front to back in alignment with the conduits therein.

6. An apparatus in accordance with claim 5 in which the valves are tapered from one end to the other and seated in correspondingly shaped tapered holes through the manifold block, and sealing means including a screw threaded fastener for clamping each valve in its seat in the block.

7. An apparatus in accordance with claim 5 in which each valve comprises a valve element mounted for rotation relative to the block and having an opening therein in alignment with the conduit in said block, and means for rotating the valve element to close the conduit without displacing any fluid in the conduit.

8. An apparatus in accordance with claim 7 in which each valve comprises a tapered housing set in a correspondingly shaped tapered hole through the block, said housing having right angular holes therein, one of the holes in the housing being aligned with the conduit in the block and the other hole extending from the first hole outwardly from the block, said valve element comprising a sphere located in one of the holes in said housing and having a cylindrical hole therein in alignment with the conduit to be controlled and a slot in its periphery, sealing rings between the spherical valve element and holes in the housing, and a valve stem in the other hole in the housing and engaging the slot in the spherical valve element for rotating the latter.

9. An apparatus in accordance with claim 7 in which a pneumatic actuator is provided for each valve, and an electromagnetically operated control valve for each pneumatic actuator.

10. In an apparatus for testing parts for leaks of the type including instrumentalities to first fill the part to be tested with a fluid under pressure, stabilize the pressure in said part and then test the part for leaks in a predetermined timed sequence, that improvement which comprises an electronic circuit for timing and initiating operation of the instrumentalities comprising a plurality of RC timing networks, one for each of the steps to be performed, a semiconductor control device connected to each network which fires a predetermined period of time after energization of its network, each control device being connected to energize a branch circuit having an instrumentality therein, and means for energizing the first network to cause the instrumentalities to be operated in succession in a predetermined timed relation for automatically testing the part for leaks.

11. In an apparatus for testing parts for leaks including a closure for forming a sealed chamber in the part to be tested, a measuring instrument having separate chambers and *a* movable diaphragm for indicating a difference in pressure in said chambers, a source of fluid under pressure, conduit means connecting said source of fluid pressure to the separate chambers of the measuring instrument and the sealed chamber in the part to be tested, a fill valve in said conduit means for controlling the flow of fluid from said source to the chambers of the measuring instrument and chamber of the part being tested, a divide valve in said conduit means for segregating one of the chambers of the measuring instrument from the other chamber and chamber in the part being tested, means responsive to movement of the diaphragm corresponding to a difference of pressure in the separate chambers of the measuring instrument, and an electric circuit for controlling operation of the valves in succession, that improvement in said electric circuit comprising a plurality of RC networks, one for each of the successive steps of filling, stabilizing and testing, each network including a semiconductor current control element which fires a predetermined period of time after energization, and said circuit connecting said RC networks so that the firing of the semiconductor current control element of at least one RC network energizes an adjacent network to perform the series of operations in succession in a predetermined timed relation.

12. An apparatus in accordance with claim 11 in which the first RC network of the plurality of networks comprises a branch circuit having a silicon control rectifier, resistor and capacitor connected in series across an electric line, a unijunctional transistor connected across the line and having an emitter connected between the resistor and capacitor and which fires a predetermined period of time after the first silicon control rectifier fires, and an electric responsive indicator connected across the line in series with a silicon control rectifier and is parallel with the RC network to indicate operation of the first step of the test.

13. An apparatus in accordance with claim 12 in which the electric circuit comprises an electric responsive indicator, a branch of said circuit including the transistor, a pressure responsive switch and said electric responsive indicator connected in series for energizing the indicator when the transistor fires and the pressure operated switch remains closed to indicate a large leak in the part being tested.

14. An apparatus in accordance with claim 13 in which a second RC network includes a silicon control rectifier, said electric circuit having a branch including a pressure operated switch responsive to a pressure occurring in the part being tested and connected to pulse and fire said silicon control rectifier to energize the second network when a predetermined fluid pressure occurs in said part being tested.

15. An apparatus in accordance with claim 14 in which an electric responsive indicator is connected in parallel with said second RC network whereby the indicator indicates operation of the second step of the test when the silicon control rectifier fires.

16. An apparatus in accordance with claim 15 in which a unijunctional transistor is provided having an emitter connected to the second RC network and in parallel with the electric responsive device, and the transistor being connected to energize a third RC network.

17. An apparatus in accordance with claim 16 in which the third RC network includes a silicon control rectifier, and an electric responsive element connected in parallel with the RC network to indicate a third operation of the test.

18. An apparatus in accordance with claim 17 in which the silicon control rectifier in the third network is connected to an electric responsive element for operating the divide valve to initiate a testing operation.

19. An apparatus in accordance with claim 18 in which the means responsive to movement of the diaphragm is a transducer for producing a voltage directly proportional to differences in pressure in said chambers of the measuring instrument, an electric responsive device for indicating a small leak, and said circuit having a branch including a transistor responsive to a predetermined voltage produced by said transducer and connected in series with said electric responsive device for indicating a small leak.

20. An apparatus in accordance with claim 19 in which a unijunctional transistor is connected to the third RC network and fires a predetermined period of time after the firing of the silicon control rectifier, and an electric responsive indicating unit operated by the firing of the transistor to indicate that no leak of measurable magnitude is present in the part being tested.

21. An apparatus for testing parts for leaks comprising closure means for forming a chamber in the part to be tested, a source of fluid under pressure, a measuring instrument having separate chambers and a transducer for producing a voltage directly proportionally to differences in pressure in said different chambers, conduit means connecting said source of pressure to the separate chambers of the measuring instrument and chamber in the part to be tested, a fill valve for controlling the flow of fluid in said conduit means to produce the same pressure in the separate chambers of the measuring instrument and part to be tested, a divide valve for isolating one chamber of the measuring instrument from the other, an electric circuit for operating said valves in sequence to perform successive testing steps, said circuit including a timing RC network and a semiconductor current controlling device which fires a predetermined period of time after energization, a current responsive device in said circuit for indicating a leak, a sensing device having a semiconductor current control element therein which is fired by a predetermined voltage from the transducer to energize the current responsive device to indicate a leak, and said timing RC network being connected to control the period of time during which the sensing device is operative to fire the semiconductor current control element therein.

22. In a testing apparatus, a measuring instrument for measuring a difference in pressure in a part being tested and a trapped sample, a transducer for producing an electric potential proportional to any difference in pressure in the chambers of the measuring instrument, and an electric control circuit having a sensing branch with a semiconductor which fires when an electric potential is impressed thereon and connected to the transducer to render it conductive when a predetermined potential is produced corresponding to a difference in pressure, a current responsive branch having an indicating element and a semiconductor which fires when an electric potential is impressed thereon, said semiconductor being directly connected to be pulsed by current flow from the semiconductor in the sensing branch whereby to produce a current flow through the indicating element and a control branch connected to energize the sensing branch and having an RC network to control the period during which the sensing branch is operative to indicate a leak.

23. A leak testing apparatus in accordance with claim 22 in which the means connected to energize the sensing branch comprises a first semiconductor control element, a timing branch, a second semiconductor control element, and said sensing branch, timing branch and second semiconductor control element being connected in parallel with each other and in series with said first semiconductor control element, said second semiconductor being connected to the timing branch for producing a current flow after a predetermined period of time, a second branch circuit having a current responsive indicating element therein and a semiconductor control element, and means for pulsing the first mentioned semiconductor to simultaneously energize the timing and sensing branches, said first branch circuit having a current responsive indicating element being connected to shut off current flow through the first semiconductor control element when energized, and said timing branch circuit pulsing the second current responsive circuit if the first current responsive branch has not been energized.

24. An apparatus for testing parts for leaks of the type including a closure for forming a chamber on the part to be tested, a source of fluid under pressure, a measuring instrument having separate chambers with a diaphragm therebetween, means including valves for supplying fluid under pressure to the chamber in the part to be tested and separate chambers in the measuring instrument and then segregating one of the chambers in the measuring instrument at the initial fluid pressure from the other chambers, and an electric sensing circuit having a transducer for producing a voltage directly proportional to the difference in pressure at opposite sides of the diaphragm of the measuring instrument, a branch circuit having a semiconductor current control element therein connected to be pulsed by the transducer upon the occurrence of a difference of pressure in the chambers of the measuring instrument, an electric responsive branch controlled by the firing of the semiconductor current control element in a sensing circuit to indicate *a* leak in the part, said semiconductor current control element being a transistor and the electric sensing circuit comprising a resistance bridge connected to the outlet from the transducer and connected to the emitter of the transistor to fire the latter when a voltage is produced by the transducer.

25. An apparatus for testing parts for leaks having a measuring instrument for measuring any difference in pressure between the part being tested and a closed chamber, a transducer for converting any difference in pressure to an electric potential, an electric control circuit having a responsive branch including an indicating element for indicating a leak, a sensing branch connected to the responsive branch and having a normally closed switch operable to open position by a pressure in the part to be tested to indicate a leak if the switch fails to open, a second sensing branch connected to the responsive branch in parallel with the first mentioned sensing branch and having a normally open switch operable to closed position by a rapid fall in pressure in the part to be tested to indicate a leak, and an RC network in the electric control circuit and connected to energize the second sensing branch after a predetermined period of time.

26. A testing apparatus for testing parts for leaks having a measuring instrument for measuring a difference in pressure in a part being tested and a trapped sample, a transducer for producing an electric potential proportional to any difference in pressure, an electric control circuit having a current responsive branch with an indicating element and a semiconductor therein, a sensing branch connected to the current responsive branch and having a semiconductor connected to be pulsed and a normally closed switch operable to open position by a pressure in the part being tested, a time delay device connected to pulse the semiconductor in the sensing branch after a predetermined period of time to energize the sensing and responsive branches to indicate a leak if the pressure operated switch fails to open, a second sensing branch connected to the current responsive branch and having a semiconductor connected to be pulsed and a normally open switch operable to closed position by a fall in the pressure in the part being tested, and a second time delay device connected to pulse the semiconductor in the second sensing circuit after a second predetermined period of time, whereby to energize the current responsive branch to indicate a leak if the pressure falls in the part being tested.

27. An apparatus for testing parts for leaks comprising a manifold block having a ballast chamber therein, a measuring instrument having separate chambers with a diaphragm therebetween and located adjacent said manifold block, a first conduit in said block connected to a source of fluid under pressure, a second conduit in said block for connecting said first conduit to said chambers of the measuring instrument, a third conduit in said block for connecting the first conduit to the atmosphere, a fourth conduit in said block for connecting the first conduit to the part being tested, a fill valve in the first conduit for controlling the supply of fluid from said source to all of the chambers, a divide valve for isolating one of said chambers of the measuring instrument and chamber in the manifold block from the other chamber of the measuring instrument and part being tested, a dump valve in the third mentioned conduit for controlling the exhaust of testing fluid from the chambers, said ballast chamber being formed in said block by drilling a hole in said block from one edge, said first and third conduits being formed by a hole drilled through said block parallel to the hole forming the ballast chamber, and said second and fourth conduits being formed by a hole drilled in said block transversely of the first and second holes and intercepting the latter intermediate their ends.

References Cited

The following references, cited by the Examiner, are of record in the patented file of this patent or the original patent.

UNITED STATES PATENTS

| | | | |
|---|---|---|---|
| 2,924,965 | 2/1960 | Westerheim | 73—40 |
| 2,936,611 | 5/1960 | Le Mat | 73—40 |
| 3,031,884 | 4/1962 | Martin | 73—40 |
| 3,091,958 | 6/1963 | Robins | 73—46 |
| 3,221,539 | 12/1965 | Evans | 73—45.2 |

S. CLEMENT SWISHER, Primary Examiner

UNITED STATES PATENT OFFICE
CERTIFICATE OF CORRECTION

Reissue No. 26,661 September 9, 1969

Richard Thomas Fitzpatrick et al.

It is certified that error appears in the above identified patent and that said Letters Patent are hereby corrected as shown below:

Column 7, line 69, "2,696,556" should read -- 2,696,566 --.

Signed and sealed this 30th day of March 1971.

(SEAL)
Attest:

EDWARD M.FLETCHER,JR.
Attesting Officer

WILLIAM E. SCHUYLER, JR.
Commissioner of Patents